Sept. 2, 1958     E. G. HILL ET AL     2,849,864
BOOSTER BRAKE MECHANISM
Filed Jan. 30, 1956     3 Sheets-Sheet 1
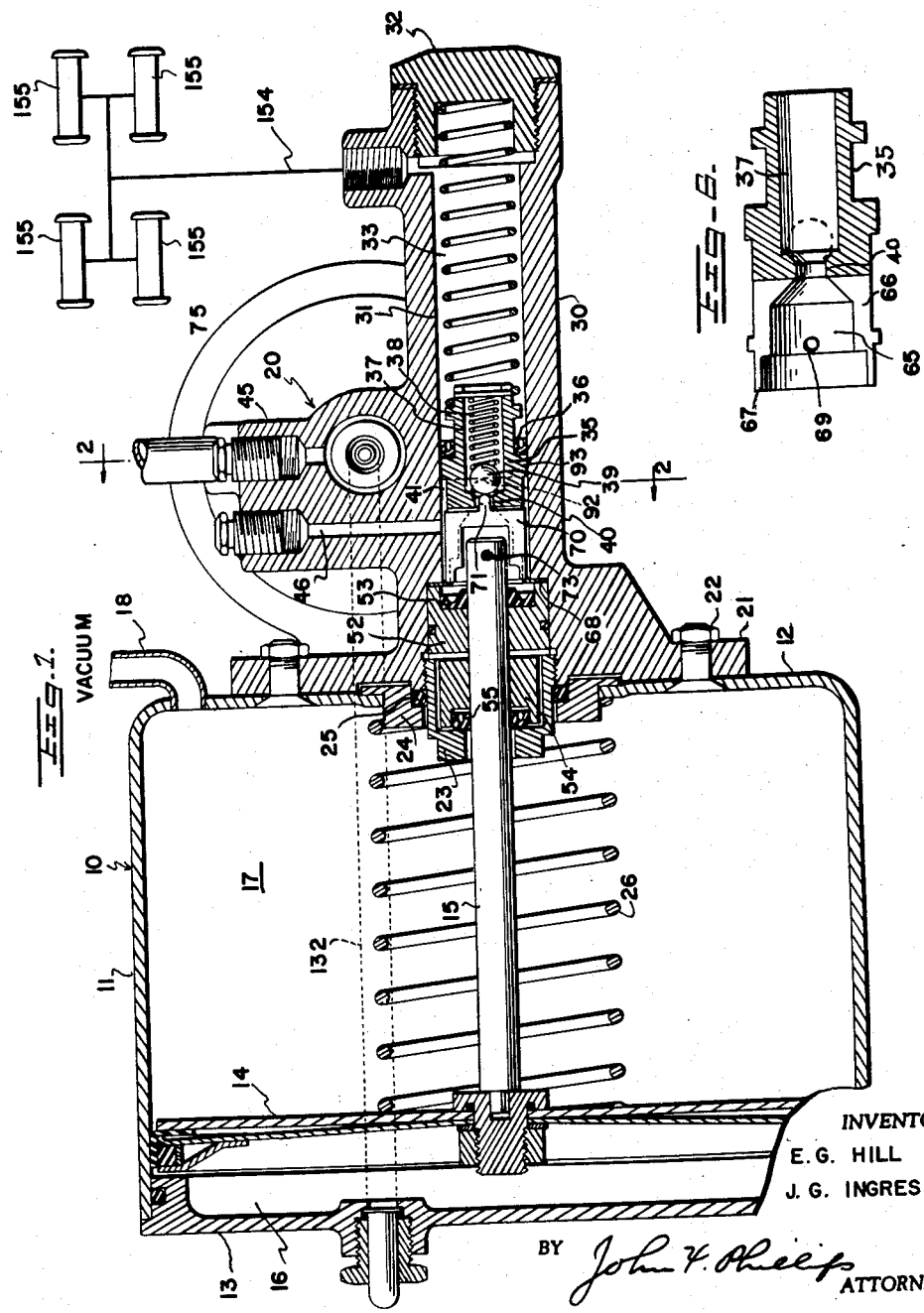
INVENTORS
E. G. HILL
J. G. INGRES
BY John F. Phelps
ATTORNEY

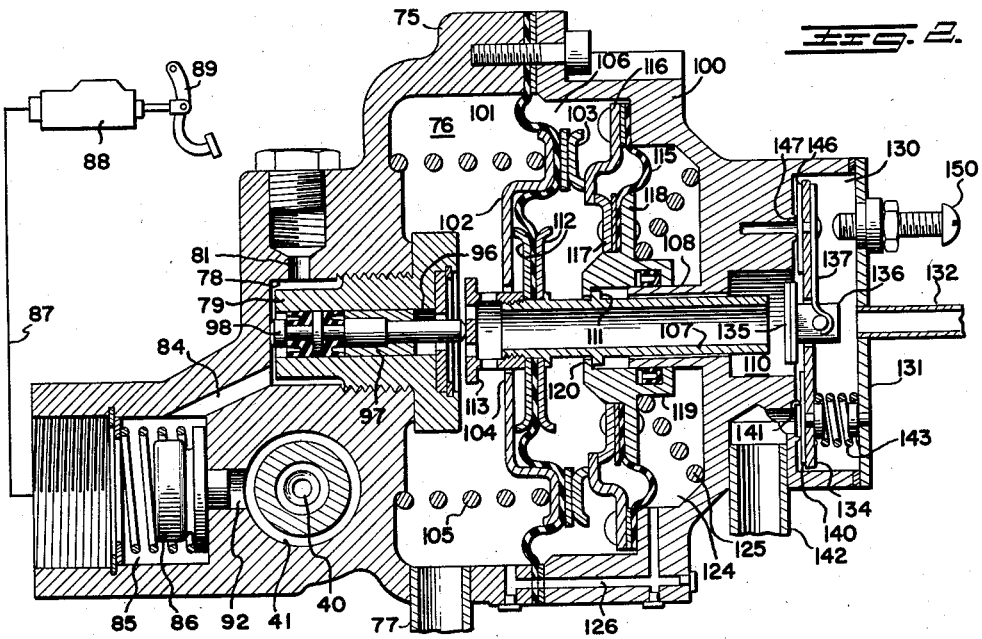
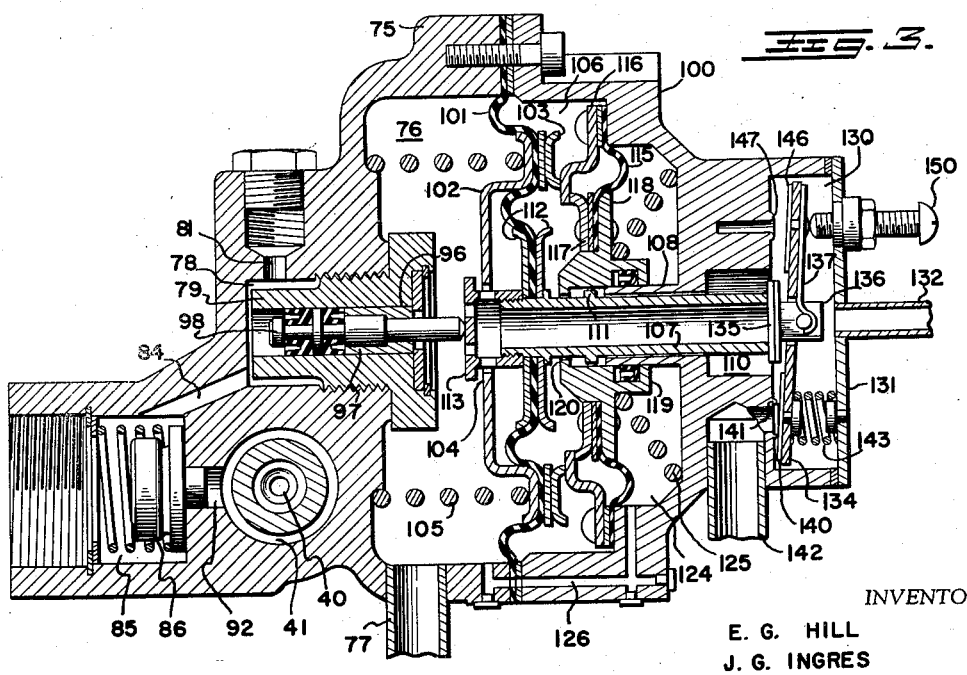
INVENTORS
E. G. HILL
J. G. INGRES

Sept. 2, 1958  E. G. HILL ET AL  2,849,864
BOOSTER BRAKE MECHANISM

Filed Jan. 30, 1956  3 Sheets-Sheet 3

INVENTORS
E. G. HILL
J. G. INGRES

BY John V. Philips
ATTORNEY

United States Patent Office 2,849,864
Patented Sept. 2, 1958

2,849,864

BOOSTER BRAKE MECHANISM

Edward Govan Hill, Birmingham, and Jeannot G. Ingres, Dearborn, Mich., assignors to Kelsey-Hayes Company, a corporation of Michigan Application January 30, 1956, Serial No. 562,066

15 Claims. (Cl. 60—54.6)

This invention relates to a booster brake mechanism and is an improvement over the structure shown in the copending application of Jeannot G. Ingres, Serial No. 540,240, filed October 13, 1955.

The copending application referred to above shows a novel booster brake mechanism wherein operation of the brake pedal energizes the booster motor by operating the valve mechanism thereof. It is highly desirable in an apparatus of this character to provide the pedal with an initial "softness," but it is also desirable that pedal operation be resisted and that the resistance progressively increase. The structure of the copending application provides elastic fluid reaction means which comes into operation upon intial motor energization to provide initially slight and progressively increasing elastic fluid reaction against movement of the brake pedal.

In the copending application the elastic fluid reaction means is provided by a diaphragm only the inner portion of which provides the initial pedal reaction until predetermined booster motor energization has been built up, whereupon outer portions of the diaphragm come into operation to increase the pedal reaction. The reaction means referred to provides reaction forces against the pedal which progressively increase until full motor energization is effected. Prior to such point, however, the apparatus functions to transmit to the brake pedal direct hydraulic reactions in the brake system in proportion to the degree of brake application. These hydraulic reactions are added to the elastic fluid reactions provided by the diaphragm means. As a result, the total reaction starts to increase relatively rapidly from the point where the brake shoes initially contact with the drums.

An important object of the present invention is to provide a mechanism which is an improvement over the structure of my copending application in that it provides means automatically counteracting part of the elastic fluid reaction when the mechanism starts to apply hydraulic reaction forces to the brake pedal, thus reducing pedal reactions from such point on in the application of the brakes, and consequently preventing a relatively sharp increase in the total reaction forces after initial brake application takes place.

A further object is to provide such an apparatus wherein elastic fluid operated means is connected to be responsive to the fluid pressure booster motor to apply elastic fluid reactions to the brake pedal during initial brake operation and wherein the elastic fluid reaction increases with motor energization, and to provide means which automatically comes into operation after the booster motor is energized to a predetermined extent, and preferably at the point of initial engagement of the brake shoes with the drums, for counteracting a part of the elastic fluid reaction applied to the brake pedal whereby the reaction curve progressively increases from initial operation of the brake pedal to the full application of the brakes.

A further object is to provide such an apparatus wherein a pedal operable master cylinder displaces fluid into the booster mechanism and operates the valve mechanism for the booster motor, and wherein such displacement of fluid is resisted upon booster motor energization by pressure responsive means only a portion of which is operative during initial motor energization and other portions of which come into play during later stages of booster motor operation, and to provide in conjunction therewith a fluid pressure responsive means dependent upon booster motor energization to be movable in a direction opposite to the direction of movement of the reaction applying means whereby, after predetermined booster motor energization has taken place, the reaction applying means is neutralized or overcome to a predetermined extent to greatly smooth out the reaction curve, which otherwise would rise quite rapidly upon the beginning of the application of hydraulic reactions to the brake pedal.

Other objects and advantages of the invention will become apparent during the course of the following description.

In the drawings we have shown one embodiment of the invention. In this showing:

Figure 1 is an axial sectional view through a booster motor mechanism, parts being broken away and parts being diagrammatically shown;

Figure 2 is an enlarged sectional view on line 2—2 of Figure 1 showing the parts in their normal off positions;

Figure 3 is a similar view showing the positions of the parts upon intial motor energization;

Figure 6 is a detail axial sectional view through the fluid displacing plunger.

Figure 4:
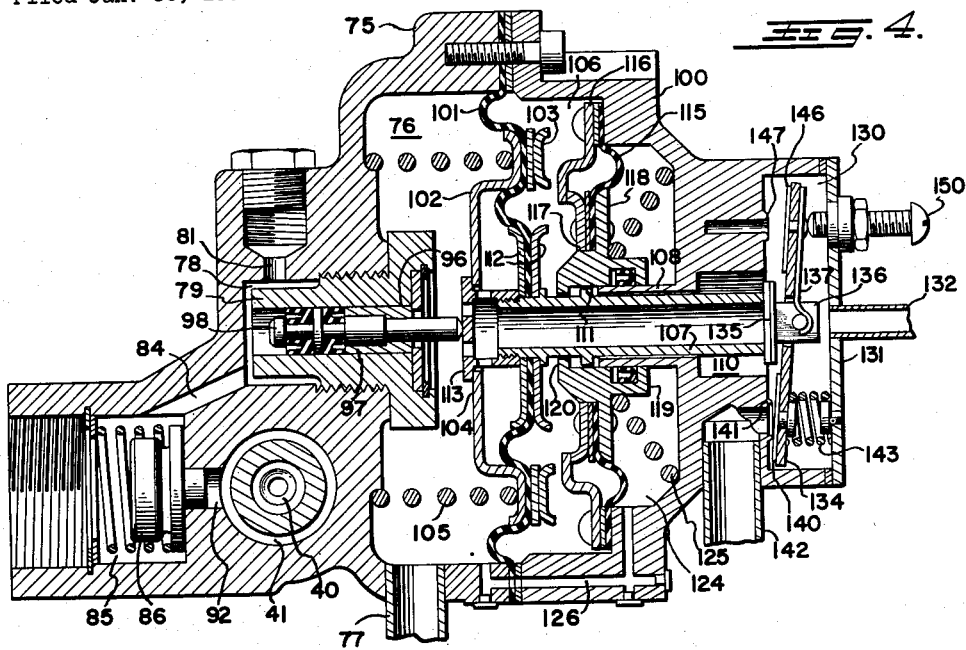
Figure 4 is a similar view showing the parts in the positions they will occupy upon further motor energization when the reaction applying means is fully operative.

Referring to Figure 1, the numeral 10 designates a booster motor as a whole comprising a cylinder 11 having at one end thereof a preferably integral head 12. The other end of the motor is closed by a head 13. The motor may be of any fluid pressure responsive type and is shown in the present instance as having a piston 14 reciprocable in the cylinder 11 and connected to a piston rod 15 movable to the right in Figure 1 when the motor is energized. The piston 14 is shown in its normal off position in Figure 1. The piston divides the cylinder 11 to form a variable pressure chamber 16 and a constant pressure chamber 17 the latter of which, in the present instance, is in constant communication wth a source of vacuum (not shown) through a duct 18.

A preferably die cast body 20 is arranged adjacent the head 12 and is provided with an annular flange 21 bolted as at 22 to the cylinder head 12. A nut 23 is threaded into the adjacent end of the body 20 and surrounds the piston rod 15. A collar 24 is fixed relative to the head 12 and flanges 21 and cooperates with the body 20 to form a recess receiving an annular seal 25 surrounding the nut 23. A piston return spring 26 engages at one end against the piston 14 and at its other end against the head 12, surrounding the collar 24.

A cylindrical extension 30, preferably integral with the body 20, extends axially from the motor and is provided with a bore 31 capped at one end as at 32 to form a hydraulic chamber 33. A plunger 35 is slidable in the bore 31 and is provided with a double-lipped sealing cup 36. The plunger 35 has a bore 37 in which is arranged a spring 38 engaging and tending to seat a ball valve 39 to thus tend to close a port 40 (Figures 1–5, inclusive) communicating between the bore 37 and the left-hand end of the bore 31. The latter portion of the bore 31 forms an inlet chamber 41 for a purpose to be described.

An integral enlargement 45 is formed on the body 20. In one side of such enlargement is formed a passage 46 communicating at one end with the chamber 41 and provided at its outer end with a conventional bleed plug which forms no part of the present invention and need not be described.

A bearing 52 is mounted in the left-hand end of the body 20 and is provided with a seal 53 the inner lip of which slidably surrounds the piston rod 15. The bearing 52 axially guides the piston rod 15. A second bearing 54 surrounds the piston rod 15. Such bearing floats laterally in the nut 23 and is sealed as at 55 with respect to the piston rod 15.

The plunger 35 extends to the left of the port 40 (Figures 1 and 6) and is provided with an axial recess 65 diametrically slotted as at 66. The left-hand extremity 67 of the plunger seats against a washer 68 (Figure 1) held in position by the bearing 52. Opposite sides of the slotted portion of the plunger are provided with alined openings 69. Within the slot 66 is arranged a flat substantially U-shaped member 70 having the extremities of its arms normally seating against the washer 68. The member 70 has an axial extension 71 projecting through the port 40 and unseating the ball 39 when the parts are in the off positions shown in Figure 1. The right-hand end of the piston rod 15 extends into the plunger recess 65 within the arms of the member 70, and a transverse pin 73 extends through the openings 69 and through the piston rod 15 to connect these elements to each other.

An annular enlargement 75 is formed on the body 20 and has its axis arranged above and perpendicular to the axis of the bore 31. The enlargement 75 (Figures 2–5, inclusive) has formed therein a vacuum chamber 76 in fixed communication through a line 77 with a suitable source of vacuum. The body 20 is further provided with a small chamber 78 into which projects one end of a nut 79 threaded into the body 20. The chamber 78 is provided with a vent passage 81 having at its upper end a conventional bleed plug forming no part of the present invention.

The chamber 78 communicates through a passage 84 with a chamber 85 in which is arranged a conventional residual pressure valve 86 (Figures 2–5, inclusive). The chamber 85 communicates through a line 87 with a conventional master cylinder 88 having the usual piston (not shown) operable by a pedal 89 to displace fluid into the chamber 85. When pressure in such chamber attains a sufficient force, the residual pressure valve 86 opens for the flow of fluid through a port 92 into the chamber 41. The port 92 is shown in dotted lines in Figure 1 slightly offset to the left of the ball valve 39, and it will be noted that this port is back of an annular flange 93 formed on the plunger 35 and against which the seal seats. Master cylinder fluid, accordingly, feeds into the chamber 41 when the residual pressure valve 86 is opened.

A bore 96 in the nut 79 slidably receives a sealed plunger 97 one end of which has a reduced stem 98 engageable with the end wall of the chamber 78 to limit movement of the plunger 97 toward the left in Figure 2. It will be apparent that master cylinder fluid flowing through passage 84 moves the plunger 97 toward the right away from its normal position shown in Figure 2.

The annular enlargement 75 (Figures 2–5, inclusive) has secured thereto a housing member 100. Between the members 75 and 100 is clamped the peripheral portion of a diaphragm 101. Intermediate its radial extremities, the diaphragm is clamped between a pair of plates 102 and 103 the former of which terminates in an inner annular flange 104 for a purpose to be described. The plate 102 is engaged by one end of a spring 105 to be urged to the right in Figure 2, the other end of the spring seating against the member or body 75. The member 75 is provided therein with the vacuum chamber 76, previously described, and the diaphragm 101 divides the chamber 76 from a control chamber 106 formed in the housing member 100.

A tubular member 107 is slidable in a bearing 108 formed integral with the housing member 100 and projecting inwardly from the center of such housing, as shown. The tubular member 107 is loosely slidable in the bearing 108 to provide substantial leakage around the tubular member 107 between the control chamber 106 and an axial chamber 110 formed in the housing member 100. The tubular member 107 is provided intermediate its ends with an annular flange 111 for a purpose to be described.

The peripherally inner portion of the diaphragm 101 is clamped between plates 112 one of which normally engages the inner face of the flange 104 when the parts are in the normal off positions shown in Figure 2. The plates 112 are fixed to the tubular member 107 by a hollow apertured cap 113, the apertures in such cap affording constant communication between the vacuum chamber 76 and the interior of the tubular member 107. The head of the cap 113 is engaged with the inner end of the stem of the plunger 97 whereby movement of the latter transmits movement to the tubular member under conditions to be described.

An auxiliary diaphragm 115 is arranged in the housing member 100 and is secured at its outer periphery to the housing member 100 by a clamping plate 116. This plate normally engages the plate 103 to limit movement thereof toward the right in Figure 2, it being apparent that the stop plate 116 is fixed to the housing member 100.

The inner periphery of the diaphragm 115 is fixed in position between a plate 117 and a flange 118, such flange forming a part of a collar 119 slidably surrounding the bearing 108 in sealed relation thereto. The annular flange 111 is axially movable within the collar 119, and such collar is provided with an internal flange 120, normally contacting the flange 111 when the parts are in the off positions shown in Figure 2. The flanges 111 and 120 limit relative movement in one direction between the tubular member 107 and collar 119 for a purpose to be described.

The diaphragm 115 divides the chamber 106 from a supplemental vacuum chamber 124 in which is arranged a spring 125 urging the inner portion of the diaphragm 115 and the collar 119 toward the left as viewed in Figure 1. Movement in such direction of the collar 119 is limited by engagement of the plate 117 with the plate 116 as shown in Figure 2. A passage 126 affords constant communication between the chambers 76 and 124, and accordingly it will be apparent that vacuum is always present in the latter chamber.

In its outer face, the housing member 100 is provided with a recess 130 forming a controlled pressure chamber, capped as at 131 and communicating through a line 132 (Figures 1–5, inclusive) with the motor chamber 16. In the chamber 130 is arranged a lever 134 the center of which loosely supports a vacuum valve 135 having a stem 136 projecting through the lever, the valve 135 being resiliently urged inwardly by a spring 137.

One end of the lever 137 is provided against the inner face thereof with a resilient disk valve 140 engageable with a seat 141 controlling communication between the chamber 130 and an air pipe 142, preferably connected to an air cleaner (not shown). A spring 143 urges the valve 140 to closed position and is slightly offset upwardly, as viewed in Figure 2, from the axis of the valve seat 141. The end of the lever 134 opposite the air valve 140 is provided with a resilient disk 146 engageable against an annular seat 147, this arrangement being provided to assist in squaring the position of the lever 134 in the off positions of the parts shown in Figure 1 to assist in proper closing of the air valve 140.

An adjusting screw 150 is threaded in the cap 131 preferably in axial alinement with the seat 147. This screw limits movement to the right in Figure 2 of the adjacent end of the lever 134 for a reason which will become apparent.

Obviously, hydraulic pressure in the chamber 33 is utilized for applying the vehicle brakes. To this end, hydraulic lines 154 extend from the chamber 33 to the vehicle wheel cylinders 155 to apply the vehicle brakes.

Operation

The parts normally occupy the positions shown in Figures 1 and 2. When the brakes are to be operated, the driver depresses the pedal 89 to displace fluid through line 87 (Figure 2) into the chamber 85. Initially, the residual pressure valve 86 remains closed. However, there is no resistance to the flow of fluid through the passage 84 into the chamber 78 except for the slight frictional resistance to movement of the plunger 97 and tubular member 107. Accordingly, a "soft" initial movement of the brake pedal takes place, and fluid flowing into the plunger cylinder 96 moves the plunger 97 and tubular member 107 to the right from the position shown in Figure 2.

The right-hand end of the tubular member 107 (Figure 2) engages against the vacuum valve 135, thus disconnecting the chamber 110 from communication with the source of vacuum through the tubular member 107 and chamber 76. Slight further movement of the tubular member 107 imparts movement to the lever 134 and the action of the biasing spring 143 tends to hold on its seat the air valve 140. As a result, the lever 134 is moved angularly as suggested in Figure 3 to crack the port 141 at the upper side thereof, thus providing limited communication between the air pipe 142 and the chamber 130.

The closing of the vacuum valve, of course, disconnects the chamber 130 from the source of vacuum, and upon the cracking of the air valve, air flows into the chamber 130, thence through pipe 132 (Figures 1 and 3) into the motor chamber 16 to begin the energization of the motor 10. The piston 14 will start to move to the right and the pin 73 will impart movement to the plunger 35 to move it in the same direction. Slight initial movement of this plunger frees the biasing spring 38 (Figure 1) so that it seats the ball valve 39 to disconnect the chambers 33 and 41. From this point on, movement of the plunger 35 builds up hydraulic pressure in the chamber 33 to displace fluid into the wheel cylinders.

The admission of air into the chamber 130 (Figure 3) results in the seepage of air around the tubular member 107 into the chamber 106, it being recalled that a relatively loose fit is provided between the member 107 and bearing 108 to provide for this action. As soon as air pressure is admitted into the chamber 130, therefore, air also will be admitted into the chamber 106 to create differential pressures on opposite sides of the diaphragm 101. Upon initial energization of the motor 10, the pressure in the chamber 106 is not sufficient to overcome the spring 105 and, accordingly, the ring 103 (Figure 3) will remain in contact with the plate 116. However, differential pressures affecting the central portion of the diaphragm 101 will transmit a force to the tubular member 107 to resist movement thereof toward the right. The fluid pressure affecting the central portion of the diaphragm 101, of course, increases as motor energization increases, and accordingly almost immediately upon initial energization of the motor 10, elastic fluid pressure reaction will be transmitted to the master cylinder 88 against the pedal 89, as is highly desirable.

The parts in the initial stage of operation just referred to will occupy the positions shown in Figure 3, the ring 103 being in contact with the plate 116 and the radially inner edge of the plate 102 being free of the flange on the cap 113. Of course, air will start to flow into the motor 10 before the lever 134, at the upper end thereof as viewed in Figure 3, engages the adjusting screw 150. Even when such contact is made, the flow of air is still limited, and this operation is important since it prevents the rapid dumping of air into the motor chamber 16 (Figure 1) which, in many prior constructions, results in the booster motor piston jumping away from its normal off position and too rapidly building up pressure in the chamber 33.

In normal brake operations, while the lever 134 is still in the position shown in Figures 3 and 4, air pressure will be built up in the chamber 106 to a sufficient extent to overcome the spring 105, whereupon the outer portion of the diaphragm will be moved to the left, as shown in Figure 4, to engage the flange 104 with the head of the cap 113. From this point on, the full area of the diaphragm 101 will be utilized for opposing movement of the tubular member 107 and hence movement of the plunger 97, resulting in a still further progressive building up of reaction pressures tending to oppose movement of the pedal 89. This provision of progressively increasing elastic fluid pressure reactions is important since it very greatly improves the "feel" in the brake pedal 89.

In the copending application referred to, the structure provides an operation similar to that described up to this point. In the copending application, however, the full area of the reaction diaphragm is effective throughout all of the remainder of the brake application to provide increasing reaction against the brake pedal. This progressive increase in reaction continues even after the brake shoes engage the drums. The latter operation results in a very rapid rise in pressure in the chamber 33 (Figure 1) and the total reaction pressures from this point on increase very rapidly. Under such conditions, the total reaction pressures, that is, the total fluid reactions added together, become disproportionate to the actual hydraulic pressures being delivered to the wheel cylinders.

Figure 5:
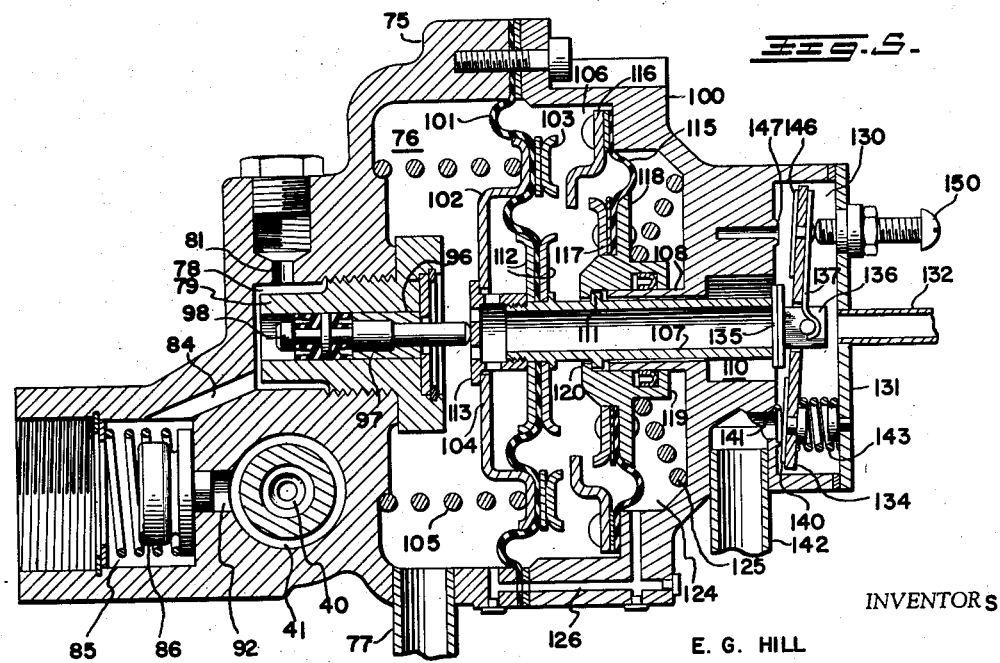
Figure 5 is a similar view showing the positions of the parts in a later operation of the booster motor in which the reaction forces are partially neutralized.

The present construction operates to minimize the elastic fluid pressure reactions starting from the point where hydraulic reactions increase incidental to engagement of the brake shoes with the drums. It will be noted that in the operation of the apparatus up to this point, the spring 125 (Figures 2, 3 and 4) has been sufficiently strong to maintain contact between the ring 117 and plate 116, and the flange 111 will have been moving to the right away from the flange 120. Approximately at the point where hydraulic reaction begins to increase, pressure in the chamber 106 overcomes the loading of the spring 125 and the diaphragm 115 and collar 119 move to the right to engage the flange 120 against the flange 111, as shown in Figure 5.

The elastic fluid reaction provided by the diaphragm 101 acts to the left in Figures 2–5, inclusive, while fluid pressures affecting the diaphragm 115 act toward the right. The diaphragm 115 thereby provides a force tending to counteract reaction pressures transmitted from the diaphragm 101 and associated elements to the plunger 97. The area of the diaphragm 115 being smaller than that of the diaphragm 101, the total counteracting forces of the diaphragm 115 will always be less than the reaction forces transmitted to the brake pedal by operation of the diaphragm 101.

From the foregoing it will be apparent that the two-stage operation of the diaphragm 101 provides progressively increasing reactions against the brake pedal in accordance with the progressive increasing of the pressure in the motor chamber 16. However, when the brake shoes engage the drums of the wheels, there will be a rapid increase in pressure in the chamber 33, and at this point, the diaphragm 115 comes into operation as shown in Figure 5 to oppose the action of the diaphragm 101, thus preventing this diaphragm from continuing the application of progressively greater reactions against the brake pedal during the remainder of the brake application.

This operation prevents a rapid rise in the reaction curve beyond the point where the brake shoes engage the drums. The reaction curve, accordingly, is very greatly smoothed out and from the point where initial brake shoe engagement takes place to the point of complete brake application the reaction against the brake pedal 89 is substantially proportionate to the degree of brake application. The features of the apparatus, accordingly, are such that an extremely smooth operation is provided, completely free of "lumpiness" in pedal operation.

At a predetermined point in the initial operation of the apparatus, pressure in the chamber 85 (Figures 2–5, inclusive) will reach a point where the residual pressure valve 86 will open. Assuming that this pressure is not reached in the chamber 85 previous to the closing of the ball valve 39 (Figure 1), movement of the plunger 35 toward the right will reduce pressure in the chamber 41, thus creating on opposite sides of the residual pressure valve 86 the differential pressures necessary to open such valve. Accordingly, master cylinder fluid will enter the chamber 41 and pedal generated pressures will assist the piston 14 in generating brake applying pressures in the chamber 33.

When the brake pedal is released, the piston 14 will be returned to normal position by the spring 26 and by the return spring for the plunger 35. Just prior to the point where the plunger 35 reaches its fully off position, the member 70 will engage the washer 68. Slight further movement of the plunger 35 causes the projection 71 to unseat the ball 39 to connect chambers 33 and 41.

The releasing of the brake pedal, of course, releases pressure in the chamber 78 (Figure 2), and the spring 143 will return the lever 134 to its normal off position. The spring 143 exerts a force against the tubular member 107 to assist in moving this member and associated elements back to normal off position. Suction provided in the chamber 78 by movement of the brake pedal to the fully off position retracts the plunger 97 and tubular member 107 to the fully off positions shown in Figure 2. When such position is reached, air will be exhausted from the chamber 106 through the play around the tubular member 107, thus balancing pressures in the chambers 76, 106 and 124. The spring 105 will then move the diaphragm 101 back to its normal position with the ring 103 engaging the plate 116. The spring 125 returns the collar 119 to its normal position with the ring 117 engaging the plate 116 as shown in Figure 2. The opening of the vacuum valve 135 again connects the motor chamber 16 to the source of vacuum to vacuum suspend the motor 10.

It is to be understood that the form of the invention shown and described is to be taken as a preferred example of the same and that various changes in the shape, size and arrangement of the parts may be made as do not depart from the spirit of the invention or the scope of the appended claims.

We claim:

1. A hydraulic pressure generating mechanism comprising a cylinder, a plunger slidable in said cylinder and dividing it to form a pair of chambers one of which is a hydraulic chamber having an outlet for the performance of work by hydraulic pressure developed therein, a differential fluid pressure motor having a pressure responsive unit connected to said plunger to move it toward said one chamber, pedal operated fluid displacing means connected to supply hydraulic fluid to said other chamber to assist said motor in moving said plunger, a valve mechanism connected to said motor and operative for connecting the latter to a source of relatively high pressure to operate said motor, hydraulically operable means connected to said valve mechanism to operate it and connected to said pedal operable mechanism to be operable by fluid displaced therefrom, elastic fluid pressure operable means connected to be operated by pressures equal to the differential pressures in said motor and connected to oppose displacement of hydraulic fluid by said pedal operable mechanism to transmit reaction thereto, and control means exposed to opposing pressures equal to differential pressures in said motor to oppose reaction generated by said elastic fluid pressure operable means after predetermined differential pressures have been generated in said motor.

2. A mechanism according to claim 1 wherein said control means comprises a fluid pressure responsive device connected to be subject to opposing pressures equal to the differential pressures in said motor and arranged to act in opposition to said elastic fluid pressure operable means.

3. A mechanism according to claim 1 wherein said elastic fluid pressure operable means has mechanical connection with said hydraulically operable means to oppose movement thereof from a normal off position upon energization of said motor, said control means comprising a fluid pressure reaction device having mechanical connection with said hydraulically operable means and exposed to opposing pressures equal to the differential pressures in said motor to become operative to act in opposition to said elastic fluid pressure operable means after said motor has become energized to a predetermined extent.

4. A mechanism according to claim 1 wherein said elastic fluid pressure operable means has mechanical connection with said hydraulically operable means to oppose movement thereof from a normal off position upon energization of said motor, said control means comprising a fluid pressure reaction device having mechanical connection with said hydraulically operable means, and spring means connected to oppose operation of said control means during initial energization of said motor whereby said control means becomes operative only upon the generation of predetermined opposing pressures equal to the differential pressures in said motor.

5. A hydraulic pressure generating mechanism comprising a cylinder, a pressure generating plunger slidable in said cylinder and dividing it to form a high pressure and a low pressure chamber, a fluid pressure motor having a pressure responsive unit connected to said plunger and operable to move the latter toward said high pressure chamber, pedal operable hydraulic fluid displacing means connected to said low pressure chamber, a normally inoperative valve mechanism connected to said motor and connected to be operable to establish opposing differential pressures therein to move said plunger, valve operating means comprising a hydraulic plunger connected to said valve mechanism and connected to be operated by hydraulic fluid displaced by said pedal operable means, elastic fluid pressure responsive means connected to be subject to pressures equal to the differential pressures in said motor and having a portion connected to said valve operating means to oppose movement of the latter from a normal off position upon initial energization of said motor, spring means connected to bias another portion of said elastic fluid pressure responsibe means to a normal off position and arranged to be overcome by pressures equal to the differential pressures in said motor when the latter reach a predetermined point to increase the degree of opposition to movement of said valve operating means from its normal off position, and control means connected to be subject to opposing pressures equal to the differential pressures in said motor to oppose forces applied to said valve operating means when said differential pressures in said motor reach a point higher than said predetermined differential point.

6. A mechanism according to claim 5 wherein said control means comprises a pressure responsive device connected to said valve operating means and having opposite sides connected to be subject to opposing pressures equal to said differential pressures affecting said motor, and a spring biasing said pressure responsive device to a normal position to prevent the transmission of forces to said valve operating means until said opposing pressures qual to the differential pressures in said motor reach aid point higher than said predetermined differential oint.

7. A booster brake mechanism comprising a cylinder, a pressure generating plunger slidable therein and dividing said cylinder to form a pair of chambers one of which is connected to the vehicle wheel cylinders, a fluid pressure motor having a pressure responsive unit connected to said plunger to move it into said one chamber, a pedal operable master cylinder connected to the other of said chambers, a valve mechanism connected to control communication between said motor and a source of pressure different from the atmosphere and normally balancing pressures in said motor, valve operating means connected to operate said valve mechanism to connect said motor to said source, said valve operating means comprising a hydraulic cylinder and a hydraulically operated plunger therein connected to be operated by hydraulic fluid displaced from said master cylinder, a diaphragm having fluid chambers at opposite sides thereof one of which is connected to said motor, said diaphragm being connected to said valve operating means whereby, when different pressures are established on opposite sides of said diaphragm the latter will oppose movement of said valve operating means from a normal off position, and a second diaphragm connected to said valve operating means and having pressure chambers on opposite sides thereof connected to said source and to said motor but oppositely with respect to the connection of the chambers on opposite sides of said first-named diaphragm with said source and with said motor whereby said second diaphragm will act in opposition to said first-named diaphragm, and spring means opposing movement of said second diaphragm whereby the latter becomes effective for opposing the action of the first-named diaphragm after said second diaphragm has become subject to opposing predetermined pressures equal to differential pressures established in said motor.

8. A mechanism according to claim 7 wherein said first-named diaphragm has its inner periphery directly connected to said valve operating means, a biasing spring tending to hold radially outer portions of said first-named diaphragm in normal positions whereby the inner portion of said first-named diaphragm will become effective to oppose movement of said valve operating means immediately upon energization of said motor and the outer portions of said first-named diaphragm become similarly effective after higher differential pressures are developed in said motor, said spring means for holding said second diaphragm in normal position rendering said second diaphragm ineffective for opposing movement of said valve operating means until after the outer portions of said first-named diaphragm become effective.

9. A booster brake mechanism comprising a cylinder, a pressure generating plunger therein dividing said cylinder to form high and low pressure chambers, a pedal operable master cylinder connected to supply hydraulic fluid to said low pressure chamber, a differential pressure motor having a pressure responsive unit connected to said plunger, a normally inoperative valve mechanism connected to balance pressures in said motor and connected to be movable to connect said motor to a source of pressure different from the atmosphere, means for operating said valve mechanism comprising an interconnected plunger and sleeve the former of which is connected to be operated by fluid displaced from said master cylinder to operate said valve mechanism, a diaphragm having a pair of chambers at opposite sides thereof one of which is connected to said source and the other of which communicates with said motor to be subjected to opposing pressures therein, said diaphragm having mechanical connection with said sleeve whereby, when differential pressures are present in said motor, said diaphragm will be subjected to such said opposing pressures equal to the differential pressures to oppose movement of said valve operating means from a normal off position, a second diaphragm having one side open to the chamber of said pair which communicates with said motor, the other side of said second diaphragm being connected to be subjected to said opposing pressures equal to the pressures in said source, means for limiting movement of said second diaphragm to a normal off position, said second diaphragm having lost motion connection with said sleeve, and means connected to bias said second diaphragm to its normal off position whereby, after said opposing pressures equal to the predetermined differential pressure has been built up in said motor, said biasing means will be overcome and said second diaphragm will take up said lost motion connection to apply a force to said sleeve in a direction opposite to the force applied thereto by said first-named diaphragm.

10. A mechanism according to claim 9 wherein said lost motion connection comprises a collar carried by said second diaphragm and provided with an internal flange, said sleeve having an external flange lying adjacent said first-mentioned flange and movable therefrom upon movement of said valve operating means to operate said valve mechanism, said flanges coming into contact when said second diaphragm is moved incident to the building-up of said opposing pressures equal to said predetermined differential pressures in said motor.

11. A mechanism according to claim 9 provided with a housing in which said diaphragms are arranged, said housing having a control chamber communicating with said motor and into which said sleeve projects to engage and operate said valve mechanism, said housing having a bearing in which said sleeve is loosely slidable to connect to said control chamber the chamber of said pair which is subject to said opposing pressures equal to the differential pressures in said motor.

12. A mechanism according to claim 9 provided with a housing in which said diaphragms are arranged, said housing having a control chamber communicating with said motor and into which said sleeve projects to engage and operate said valve mechanism, said housing having a bearing in which said sleeve is loosely slidable to connect to said control chamber the chamber of said pair which is subject to said opposing pressures equal to the differential pressures in said motor, a collar secured to the inner periphery of said second diaphragm, said lost motion connection comprising an internal flange on said collar, and an external flange on said sleeve engageable with said internal flange upon movement of said collar with said second diaphragm when said opposing pressures equal to the differential pressures in said motor reach said predetermined point.

13. A booster brake mechanism comprising a cylinder, a pressure generating plunger therein dividing said cylinder to form high and low pressure chambers, a pedal operable master cylinder connected to supply hydraulic fluid to said low pressure chamber, a differential pressure motor having a pressure responsive unit connected to said plunger, a normally inoperative valve mechanism connected to balance pressures in said motor and connected to be movable to connect said motor to a source of pressure different from the atmosphere, means for operating said valve mechanism comprising an interconnected plunger and sleeve the former of which is connected to be operated by fluid displaced from said master cylinder to operate said valve mechanism, a housing, a pair of diaphragms in said housing fixed at their outer peripheries thereto and dividing the interior of said housing to form an intermediate chamber connected to communicate with said motor and remote chambers at the remote faces of said diaphragms, said remote chambers being connected to said source whereby, when differential pressures are present in said motor, opposing pressures equal to the differential pressures in said intermediate chamber will exert forces tending to move said diaphragms away from each other, one of said diaphragms being connected at its inner periphery to said sleeve, a plate secured to radially outer portions of said one diaphragm, said sleeves having a shoulder normally spaced from said plate to be engaged thereby solely when said outer portions of said diaphragm are moved in response to pressures in said intermediate chamber, a spring engaging between said housing and said plate to urge the latter to a normal off position, a lost motion connection between the other of said diaphragms and said sleeve, and a spring heavier than said first-named spring biasing said other diaphragm to a normal off position whereby, when pressure in said intermediate chamber reaches a point higher than necessary to engage said plate with said shoulder, said lost motion connection will be taken up and said other diaphragm will oppose forces transmitted to said sleeve by said one diaphragm.

14. A mechanism according to claim 13 wherein said housing is provided with a control chamber into which said sleeve projects, and a bearing carried by said housing and through which said sleeve loosely projects to communicate between said control chamber and said intermediate chamber.

15. A mechanism according to claim 13 where said housing is provided with a control chamber into which said sleeve projects, and a bearing carried by said housing and through which said sleeve loosely projects to communicate between said control chamber and said intermediate chamber, a collar carried by said other diaphragm and slidable on said bearing in sealed relation thereto, said lost motion connection comprising interengaging shoulders on said collar and said sleeve.

References Cited in the file of this patent

UNITED STATES PATENTS 2,260,490     Stelzer _____ Oct. 28, 1941